US005600113A

United States Patent [19]
Ewers

[11] Patent Number: 5,600,113
[45] Date of Patent: Feb. 4, 1997

[54] GOLF COURSE DISTANCE MEASURING DEVICE

[76] Inventor: William E. Ewers, 12375 Military Trail, Boynton Beach, Fla. 33436

[21] Appl. No.: 378,582

[22] Filed: Jan. 26, 1995

[51] Int. Cl.$^6$ ..................................................... G01C 22/00
[52] U.S. Cl. ........................................ 235/95 R; 377/24.1
[58] Field of Search .................................. 235/95 R, 96, 235/97, 95 A, 95 B, 95 C; 377/24.1, 24.2

[56] References Cited

U.S. PATENT DOCUMENTS

| | | |
|---|---|---|
| 3,196,545 | 7/1965 | Zell et al. . |
| 3,202,353 | 8/1965 | Nowak et al. ........................ 235/95 R |
| 3,779,456 | 12/1973 | Burnett . |
| 4,308,665 | 1/1982 | Losch . |
| 4,430,561 | 2/1984 | Powell . |
| 4,680,454 | 7/1987 | Zeaman et al. . |
| 4,879,732 | 11/1989 | Dorosz ................................... 377/24.2 |

Primary Examiner—Cassandra C. Spyrou

[57] ABSTRACT

A golf course distance measuring device for calculating and recording a distance traveled by a golf cart to indicate a distance between the golf cart and a hole of a golf course. The inventive device includes a sensor assembly for monitoring a wheel of a golf cart to count revolutions of the wheel. An accumulator assembly communicates with the sensor assembly to determine a distance traveled by the golf cart. An actuating assembly is coupled to the accumulator assembly for selectively permitting and precluding communication between the sensor assembly and the accumulator assembly to allow for unmeasured traveling of the golf cart when looking for a ball. A distance input assembly permits a user to input a distance to the hole on a golf course into the accumulator assembly such that as the golf cart is driven towards the hole the distance traveled by the cart is subtracted from the distance to the hole. A display assembly is coupled to the accumulator assembly and informs the user of the distance left to the hole.

9 Claims, 3 Drawing Sheets

GOLF COURSE DISTANCE MEASURING DEVICE

BACKGROUND OF THE INVENTION

1. Field of the Invention

The present invention relates to odometer devices and more particularly pertains to a golf course distance measuring device for calculating and recording a distance traveled by a golf cart to indicate a distance between the golf cart and a hole of a golf course.

2. Description of the Prior Art

The use of odometer devices is known in the prior art. More specifically, odometer devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art odometer devices include U.S. Pat. No. 4,680,454; U.S. Pat. No. 4,430,561; U.S. Pat. No. 4,308,665; U.S. Pat. No. 3,779,456; and U.S. Pat. No. 3,196,545.

While these devices fulfill their respective, particular objectives and requirements, the aforementioned patents do not disclose a golf course distance measuring device for calculating and recording a distance traveled by a golf cart to indicate a distance between the golf cart and a hole of a golf course which includes a sensor assembly for monitoring a wheel of a golf cart to count revolutions of the wheel, an accumulator assembly communicating with the sensor assembly to determine a distance traveled by the golf cart, an actuating assembly coupled to the accumulator assembly for selectively permitting and precluding communication between the sensor assembly and the accumulator assembly to allow for unmeasured traveling of the golf cart when looking for a ball, a distance input assembly for permitting a user to input a distance to the hole on a golf course into the accumulator assembly such that as the golf cart is driven towards the hole the distance traveled by the cart is subtracted from the distance to the hole, and a display assembly coupled to the accumulator assembly for informing the user of the distance left to the hole.

In these respects, the golf course distance measuring device according to the present invention substantially departs from the conventional concepts and designs of the prior art, and in so doing provides an apparatus primarily developed for the purpose of calculating and recording a distance traveled by a golf cart to indicate a distance between the golf cart and a hole of a golf course.

SUMMARY OF THE INVENTION

In view of the foregoing disadvantages inherent in the known types of odometer devices now present in the prior art, the present invention provides a new golf course distance measuring device construction wherein the same can be utilized for calculating and recording a distance traveled by a golf cart to indicate a distance between the golf cart and a hole of a golf course. As such, the general purpose of the present invention, which will be described subsequently in greater detail, is to provide a new golf course distance measuring device apparatus and method which has many of the advantages of the odometer devices mentioned heretofore and many novel features that result in a golf course distance measuring device which is not anticipated, rendered obvious, suggested, or even implied by any of the prior art odometer devices, either alone or in any combination thereof.

To attain this, the present invention generally comprises a golf course distance measuring device for calculating and recording a distance traveled by a golf cart to indicate a distance between the golf cart and a hole of a golf course. The inventive device includes a sensor assembly for monitoring a wheel of a golf cart to count revolutions of the wheel. An accumulator assembly communicates with the sensor assembly to determine a distance traveled by the golf cart. An actuating assembly is coupled to the accumulator assembly for selectively permitting and precluding communication between the sensor assembly and the accumulator assembly to allow for unmeasured traveling of the golf cart when looking for a ball. A distance input assembly permits a user to input a distance to the hole on a golf course into the accumulator assembly such that as the golf cart is driven towards the hole the distance traveled by the cart is subtracted from the distance to the hole. A display assembly is coupled to the accumulator assembly and informs the user of the distance left to the hole.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new golf course distance measuring device apparatus and method which has many of the advantages of the odometer devices mentioned heretofore and many novel features that result in a golf course distance measuring device which is not anticipated, rendered obvious, suggested, or even implied by any of the prior art odometer devices, either alone or in any combination thereof.

It is another object of the present invention to provide a new golf course distance measuring device which may be easily and efficiently manufactured and marketed.

It is a further object of the present invention to provide a new golf course distance measuring device which is of a durable and reliable construction.

An even further object of the present invention is to provide a new golf course distance measuring device which is susceptible of a low cost of manufacture with regard to both materials and labor, and which accordingly is then susceptible of low prices of sale to the consuming public, thereby making such golf course distance measuring devices economically available to the buying public.

Still yet another object of the present invention is to provide a new golf course distance measuring device which provides in the apparatuses and methods of the prior art some of the advantages thereof, while simultaneously overcoming some of the disadvantages normally associated therewith.

Still another object of the present invention is to provide a new golf course distance measuring device for calculating and recording a distance traveled by a golf cart to indicate a distance between the golf cart and a hole of a golf course.

Yet another object of the present invention is to provide a new golf course distance measuring device which includes a sensor assembly for monitoring a wheel of a golf cart to count revolutions of the wheel, an accumulator assembly communicating with the sensor assembly to determine a distance traveled by the golf cart, an actuating assembly coupled to the accumulator assembly for selectively permitting and precluding communication between the sensor assembly and the accumulator assembly to allow for unmeasured traveling of the golf cart when looking for a ball, a distance input assembly for permitting a user to input a distance to the hole on a golf course into the accumulator assembly such that as the golf cart is driven towards the hole the distance traveled by the cart is subtracted from the distance to the hole, and a display assembly coupled to the accumulator assembly for informing the user of the distance left to the hole.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof, Such description makes reference to the annexed drawings wherein.

DESCRIPTION OF THE PREFERRED EMBODIMENT

Figure 1:
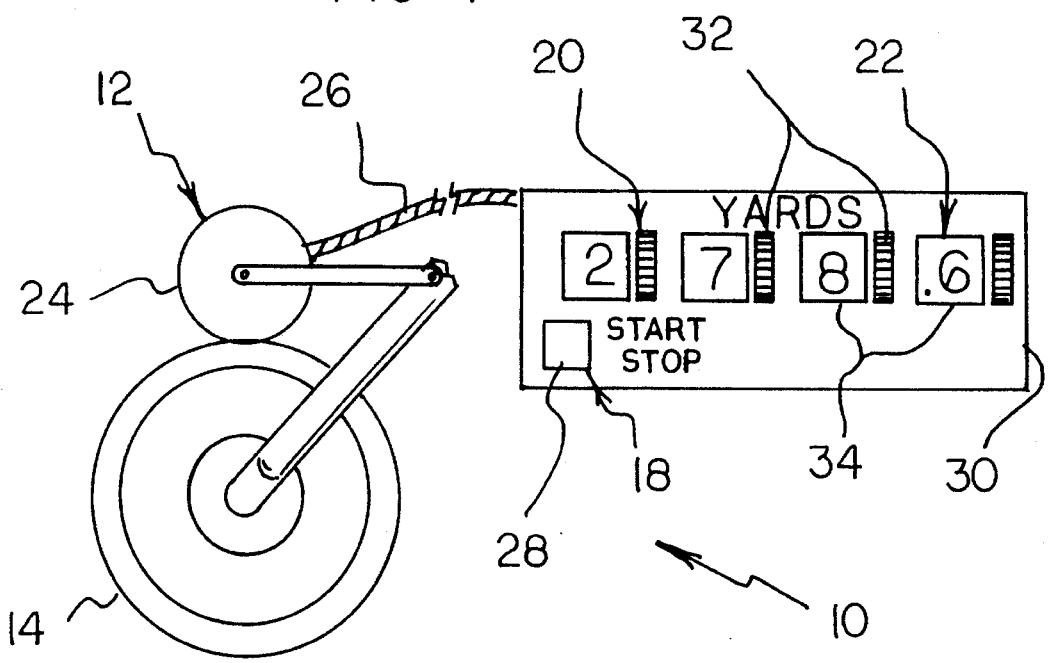
FIG. 1 is a front elevational view of a mechanical golf course distance measuring device according to the present invention.

With reference now to the drawings, and in particular to FIGS. 1–5 thereof, a new golf course distance measuring device embodying the principles and concepts of the present invention and generally designated by the reference numeral 10 will be described.

Figure 3:
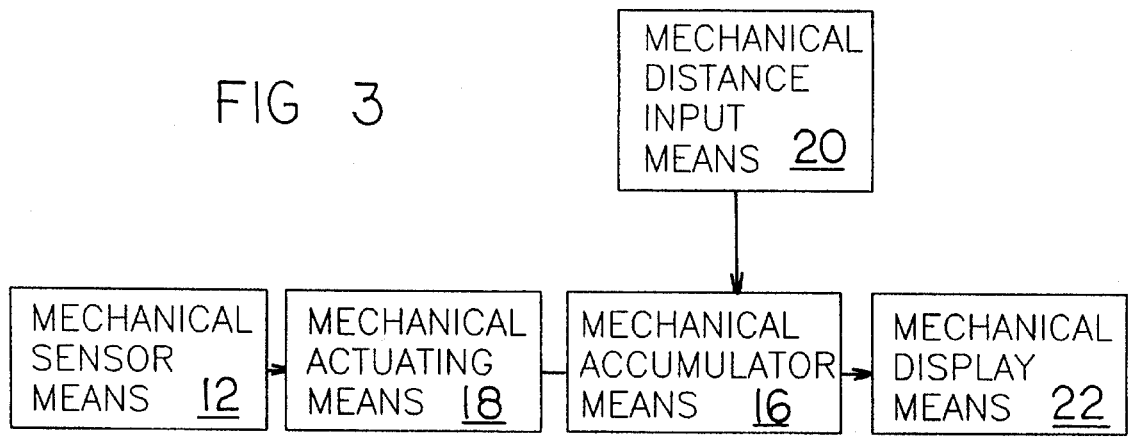
FIG. 3 is a diagrammatic illustration of the mechanical golf course distance measuring device.

More specifically, it will be noted that the mechanical golf course distance measuring device 10 illustrated in FIGS. 1 and 3 comprises a mechanical sensor means 12 for monitoring a wheel 14 of an unillustrated golf cart to count a number of revolutions of the wheel. A mechanical accumulator means 16 (see FIG. 3) communicates with the mechanical sensor means 12 to determine a distance traveled by the golf cart. A mechanical actuating means 18 is interposed between the sensor means 12 and the mechanical accumulator means 16 for selectively permitting and precluding communication between the sensor means and the accumulator means to allow for unmeasured traveling of the golf cart when looking for a golf ball. A distance input means 20 communicates with the mechanical accumulator means 16 for permitting a user to input a distance to the hole on a golf course into the accumulator means such that as the golf cart is driven towards the hole of the golf course the distance traveled by the cart is subtracted from the distance to the hole. Lastly, a display means 22 communicates with the accumulator means 16 for informing the user of the distance left to the hole, preferably calibrated in yards (increments of three feet).

Figure 5:
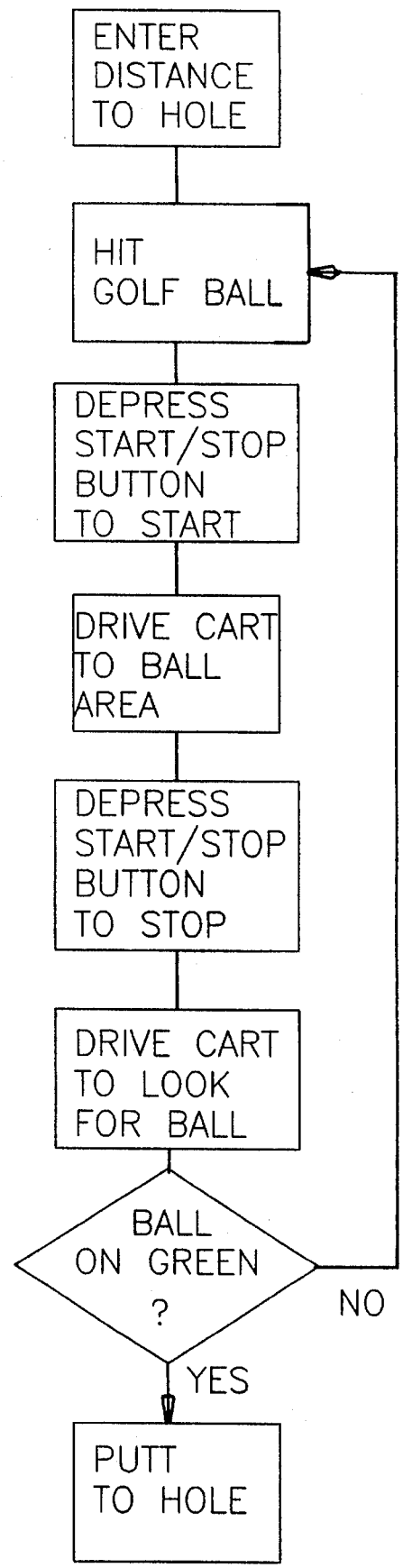
FIG. 5 is a diagrammatic illustration of a method of use of the golf course distance measuring device.

As shown in FIG. 5, the present invention 10 allows the user to input a distance to the hole, as commonly indicated by a sign posted at the tee of the golf course, into the accumulator means 16 by operating the mechanical distance input means 20. The golf ball can then be hit towards the green of the golf course. The mechanical actuating means 18 can then be operated to permit communication between the mechanical sensor means and the mechanical accumulator means 16 to record a distance traveled by the golf cart and subtract such distance from the distance to the hole input by the user. The golf cart can then be driven to the approximate ball area where the golf ball landed. If desired or needed, the mechanical actuating means 18 can then be operated to preclude communication between the mechanical sensor means 12 and the mechanical accumulator means 16 such that the golf cart can then be driven to look for the ball without recording the distance traveled by the golf cart. The mechanical display means 22 will then display the distance remaining to the hole from the point where the mechanical actuating means 16 was operated. If the golf ball has landed on the green, then no further indication of the distance to the hole is needed, as a manual estimation thereof will suffice, and the device 10 can be reset for later use on the next hole of the course. Thus, the present invention 10 indicates to the user an accurate indication of the distance left to the hole.

As shown in FIG. 1, the mechanical sensor means 12 according to the present invention 10 preferably comprises a pick-up wheel 24 rotatably mounted to a portion of the golf cart so as to engage one of the wheels 14 thereof. A cable 26 extends from the pick-up wheel 24 and into communication with the mechanical accumulator means 16. The mechanical actuating means 18 preferably comprises a mechanical clutch interposed between the cable 26 and the mechanical accumulator means 16 which can be selectively operated through repeated sequential depressions of a start-stop button 28. The mechanical accumulator means 16 is mounted within a housing 30 which can be conveniently mounted within a golf cart for viewing by a driver or user thereof. The mechanical distance input means 20 is also mounted relative to the housing 30 and includes a plurality of thumb-wheels 32 which can be individually operated to effect manual changing of the mechanical display means 22. To this end, the mechanical display means 22 comprises a plurality of rotating cylinders 34 which each include the digits zero (0) through nine (9) printed thereon, with each of the thumb-wheels 32 being in mechanical communication with an individual one of the rotating cylinders. The rotating cylinders are also mechanically coupled to the mechanical accumulator means 16 such that the cylinders 34 rotate in accordance with the negative of the distance traveled by the golf cart as determined by the accumulator means. By this structure, an individual can enter the distance to the hole by rotating the thumb-wheels 32, wherein as the golf cart travels towards the hole, the distance of travel of the golf cart will be subtracted from the total amount shown on rotating cylinders 34 of the mechanical display means 22 as entered by the user.

Figure 2:
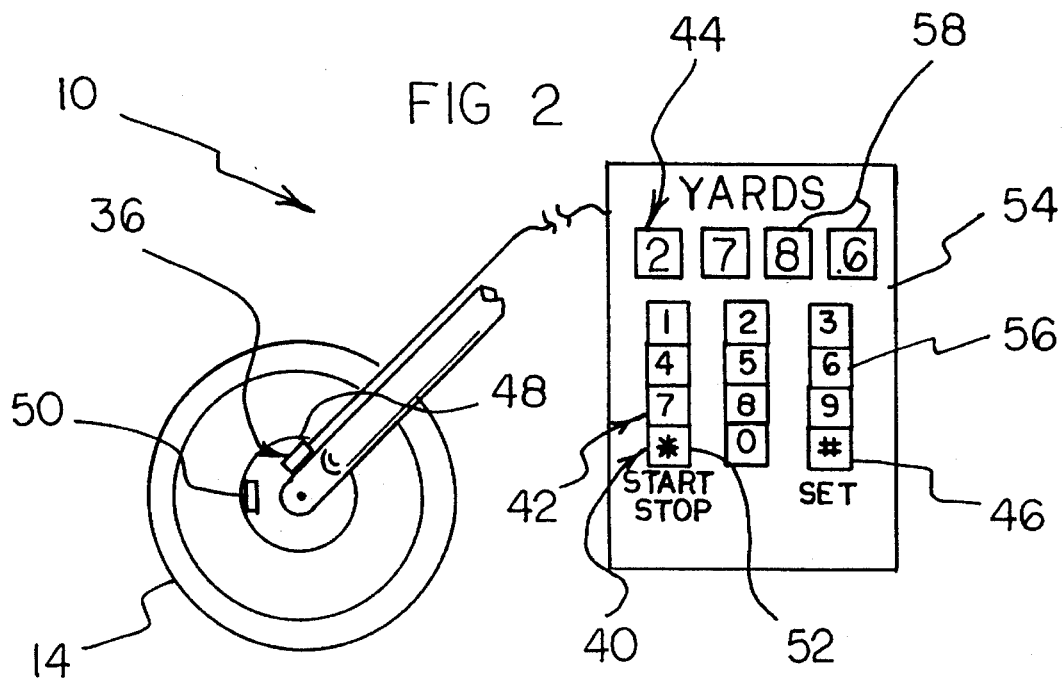
FIG. 2 is a front elevational view of a digital golf course distance measuring device according to the present invention.
Figure 4:
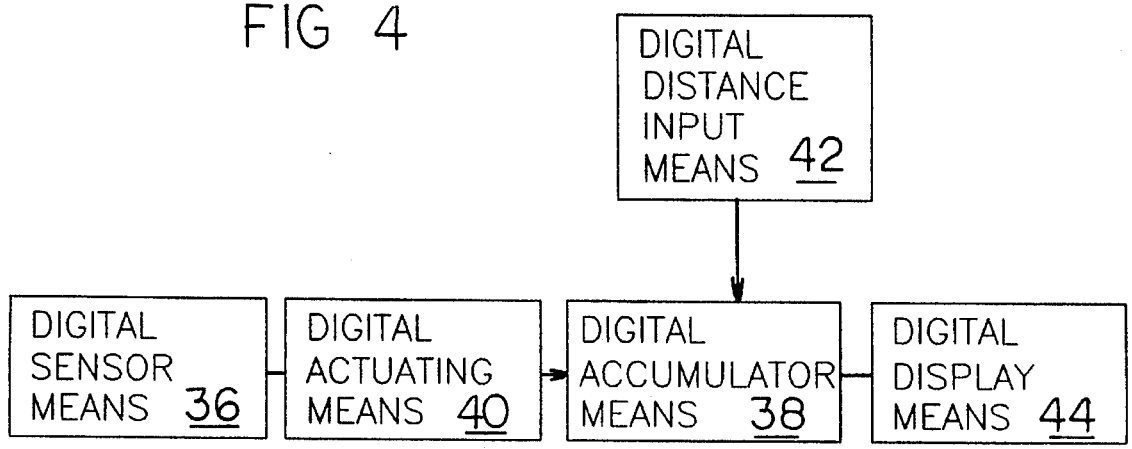
FIG. 4 is a diagrammatic illustration of the digital golf course distance measuring device.

Referring now to FIGS. 2 and 4, it can be shown that the present invention 10 may alternatively comprise a digital golf course distance measuring device. This configuration of the invention 10 similarly comprises a digital sensor means 36 for monitoring the wheel 14 of the golf cart to count a number of revolutions of the wheel. A digital accumulator means 38 (see FIG. 4) communicates with the digital sensor means 36 to determine a distance traveled by the golf cart. A digital actuating means 40 is interposed between the sensor means 36 and the digital accumulator means 38 for selectively permitting and precluding communication between the sensor means and the accumulator means to allow for unmeasured traveling of the golf cart when looking for a golf ball. A digital distance input means 42 communicates with the digital accumulator means 40 for permitting a user to input a distance to the hole on a golf course into the digital accumulator means such that as the golf cart is driven towards the hole of the golf course the distance traveled by the cart is subtracted from the distance to the hole. Further, a digital display means 44 communicates with the digital accumulator means 38 for informing the user of the distance left to the hole.

As shown in FIG. 5 and in a manner similar to that for the mechanical course distance measuring device 10, the digital golf course distance measuring device 10 allows the user to input a distance to the hole into the digital accumulator means 38 by operating the digital distance input means 42. The golf ball can then be hit towards the green of the golf course. The digital actuating means 40 can then be operated to permit communication between the digital sensor means 36 and the digital accumulator means 38 to record a distance traveled by the golf cart and subtract such distance from the distance to the hole input by the user. The golf cart can then be driven to the approximate ball area where the golf ball landed. If needed, the digital actuating means 40 can then be operated to preclude communication between the digital sensor means 36 and the digital accumulator means 38 such that the golf cart can then be driven to look for the ball without recording the distance traveled by the golf cart. The digital display means 44 will then display the distance remaining to the hole from the point where the digital actuating means 40 was disengaged. If the golf ball has landed on the green, then no further indication of the distance to the hole is needed and the device 10 can be reset by pressing a reset button 46 for later use on the next hole of the course. Thus, the present invention 10 indicates to the user an accurate indication of the distance left to the hole.

As shown in FIG. 2, the digital sensor means 36 according to the present invention 10 preferably comprises a magnetic sensor 48 in electrical communication with the digital accumulator means 38 and mounted to a portion of the golf cart so as to be positioned proximal to one of the wheels 14 thereof. A wheel magnet 50 is mounted to the wheel 14 and operates to trigger the magnetic sensor 48 each time the wheel magnet passes thereby. Thus, given the circumference of the wheel, the digital accumulator means 38 can determine a distance traveled by the golf cart in response to the number of revolutions of the wheel 14 thereof. The digital actuating means 40 preferably comprises an electronic push button switch interposed between the digital sensor means 36 and the digital accumulator means 38 which can be selectively operated through repeated sequential depressions of a start-stop button 52. The digital accumulator means 38 is mounted within a housing 54 which can be conveniently mounted within a golf cart for viewing by a driver or user thereof. The digital distance input means 42 is also mounted relative to the housing 54 and includes a keypad 56 in electrical communication with the digital accumulator means 38 to effect manual changing of the digital display means 44. To this end, the digital display means 44 comprises an electronic read-out 58 including unlabeled indicators each capable of displaying the digits zero (0) through nine (9), with the keypad being in electrical communication with the electronic read-out. The electronic read-out 58 is also in electrical communication with the digital accumulator means 38 such that the electronic read-out changes in accordance with the negative of the distance traveled by the golf cart as determined by the digital accumulator means. The electronic read out 58 may comprises an LED display, and LCD display or any other conventionally known digital readout device. By this structure, an individual can enter the distance to the hole by pushing individual buttons of the keypad 56, wherein as the golf cart travels towards the hole, the distance of travel of the golf cart will be subtracted from the total amount shown on the electronic read-out 58 as entered by the user.

In use, the golf course distance measuring device 10 according to the present invention can be easily utilized by a golfer to determine the number of yard left to a hole of a golf course. The present invention permits a golfer to accurately assess the remaining difficulty of the hole and to properly select an appropriate golf club for use during the next shot.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A golf course distance measuring device comprising:

a mechanical sensor means for monitoring a specific wheel of a golf cart having a plurality of wheels to count a number of revolutions of the specific wheel;

a mechanical accumulator means in mechanical communication with the mechanical sensor means to determine a distance traveled by the golf cart relative to the number of revolutions of the specific wheel;

a mechanical actuating means interposed between the sensor means and the mechanical accumulator means for selectively permitting and precluding communication between the sensor means and the accumulator means to allow for unmeasured traveling of the golf cart when looking for a golf ball;

a distance input means in mechanical communication with the mechanical accumulator means for permitting a user to input a distance to a hole on a golf course into the accumulator means such that as the golf cart is driven towards the hole of the golf course the distance traveled by the cart is subtracted from the distance to the hole; and, a display means in mechanical communication with the accumulator means for informing the user of a distance left to the hole, wherein the mechanical sensor means comprises a pick-up wheel rotatably mountable to a portion of the golf cart so as to engage the specific wheel, wherein a cable extends from the pick-up wheel and is in mechanical communication with the mechanical accumulator means, and wherein the mechanical actuating means comprises a start-stop button which can be selectively operated through repeated sequential depressions to selectively permit and preclude communication between the mechanical sensor means and the mechanical accumulator means.

2. The golf course distance measuring device of claim 1, and further comprising a housing, with the mechanical accumulator means being mounted within the housing, and the mechanical distance input means also being mounted relative to the housing.

3. The golf course distance measuring device of claim 2, wherein the mechanical distance input means comprises a plurality of thumb-wheels rotatably mounted to the housing which can be individually operated to effect manual changing of the mechanical display means.

4. The golf course distance measuring device of claim 3, wherein the mechanical display means comprises a plurality of rotating cylinders which are each rotatably mounted relative to the housing, each of the cylinders including the digits zero (0) through nine (9) printed thereon, with each of the thumb-wheels being in mechanical communication with an individual one of the rotating cylinders, the rotating cylinders being mechanically coupled to the mechanical accumulator means such that the cylinders rotate in accordance with a negative of a distance traveled by the golf cart determined by the accumulator means.

5. A golf course distance measuring device comprising:

a digital sensor means for monitoring a specific wheel of a golf cart having a plurality of wheels to count a number of revolutions of the specific wheel;

a digital accumulator means in electrical communication with the digital sensor means to determine a distance traveled by the golf cart relative to the number of revolutions of the specific wheel;

a digital actuating means interposed between the sensor means and the digital accumulator means for selectively permitting and precluding communication between the sensor means and the accumulator means to allow for unmeasured traveling of the golf cart when looking for a golf ball;

a digital distance input means in mechanical communication with the digital accumulator means for permitting a user to input a distance to a hole on a golf course into the digital accumulator means such that as the golf cart is driven towards the hole of the golf course the distance traveled by the cart is subtracted from the distance to the hole; and, a digital display means in digital communication with the accumulator means for informing the user of a distance left to the hole, wherein the digital sensor means comprises a magnetic sensor in electrical communication with the digital accumulator means and is mountable to a portion of the golf cart so as to be positioned proximal the specific wheel thereof, wherein a wheel magnet is mountable to the specific wheel and operates to trigger the magnetic sensor each time the wheel magnet passes thereby, and wherein the digital actuating means comprises an electronic push button switch which includes a stop-start button interposed between the digital sensor means and the digital accumulator means which is selectively operated through repeated sequential depressions of the start-stop button.

6. The golf course distance measuring device of claim 5, and further comprising a housing, with the digital accumulator means being mounted within said housing.

7. The golf course distance measuring device of claim 6, wherein the digital distance input means comprises a keypad mounted to the housing and positioned in electrical communication with the digital accumulator means to effect manual changing of the digital display means.

8. The golf course distance measuring device of claim 7, wherein the digital display means comprises an electronic read-out including indicators each capable of displaying the digits zero (0) through nine (9), the keypad being in electrical communication with the electronic read-out, with the electronic read-out also being in electrical communication with the digital accumulator means such that the electronic read-out changes in accordance with a negative of a distance traveled by the golf cart.

9. A golf course distance measuring device comprising:

a sensor means for monitoring a specific wheel of a golf cart having a plurality of wheels to count a number of revolutions of the specific wheel;

an accumulator means in communication with the sensor means to determine a distance traveled by the golf cart relative to the number of revolutions of the specific wheel;

an actuating means interposed between the sensor means and the accumulator means for selectively permitting and precluding communication between the sensor means and the accumulator means to allow for unmeasured traveling of the golf cart when looking for a golf ball;

a distance input means in communication with the accumulator means for permitting a user to input a distance to a hole on a golf course into the accumulator means such that as the golf cart is driven towards the hole of the golf course the distance traveled by the cart is subtracted from the distance to the hole; and, a display means in communication with the accumulator means for informing the user of a distance left to the hole, wherein the sensor means comprises a pick-up wheel rotatably mountable to a portion of the golf cart so as to engage the specific wheel, wherein a cable extends from the pick-up wheel and is in communication with the accumulator means, and wherein the actuating means comprises a start-stop button which can be selectively operated through repeated sequential depressions to selectively permit and preclude communication between the sensor means and the accumulator means.

* * * * *